(12) United States Patent
Otsuka et al.

(10) Patent No.: US 8,469,521 B2
(45) Date of Patent: Jun. 25, 2013

(54) PROJECTOR

(75) Inventors: Shingo Otsuka, Shiojiri (JP);
Toshimitsu Watanabe, Matsumotoshi (JP); Masato Kadotani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 13/159,870

(22) Filed: Jun. 14, 2011

(65) Prior Publication Data
US 2011/0310355 A1 Dec. 22, 2011

(30) Foreign Application Priority Data

Jun. 22, 2010 (JP) ................................. 2010-141458
Nov. 30, 2010 (JP) ................................. 2010-266226

(51) Int. Cl.
*G03B 21/16* (2006.01)
(52) U.S. Cl.
USPC ............................................. 353/60; 353/61
(58) Field of Classification Search
USPC ............................... 353/52, 56, 57, 58, 60, 61
See application file for complete search history.

(56) References Cited

U.S. PATENT DOCUMENTS

| 6,334,686 | B1 | 1/2002 | Shiraishi et al. |
| 6,751,027 | B2* | 6/2004 | Van Den Bossche et al. ............................ 359/634 |
| 7,841,721 | B2* | 11/2010 | Momose et al. ................. 353/54 |
| 2009/0141249 | A1* | 6/2009 | Yanagisawa et al. ........... 353/61 |
| 2010/0171935 | A1* | 7/2010 | Yamagishi et al. ............. 353/52 |

FOREIGN PATENT DOCUMENTS

| JP | A-2000-231154 | 8/2000 |
| JP | A-2009-36819 | 2/2009 |

* cited by examiner

*Primary Examiner* — William C Dowling
(74) *Attorney, Agent, or Firm* — Oliff & Berridge, PLC

(57) ABSTRACT

A projector includes: a plurality of reflection type light modulation devices which modulates a corresponding color light; a color synthesize optical device which has a plurality of light entrance side surfaces and a crossing surface to combine the received color lights; a heat sink which has a base attached to the corresponding reflection type light modulation device, and a fin protruding from the base and extending in a direction crossing the crossing end surface; and a duct member disposed at a position opposed to the crossing surface to supply introduced air toward the heat sink, wherein the duct member includes a first outlet section disposed opposed to the fin such that the introduced air can be supplied toward the base through the first outlet section, and a second outlet section through which the introduced air is supplied in the extending direction of the fin.

11 Claims, 12 Drawing Sheets

PROJECTOR

BACKGROUND

1. Technical Field

The present invention relates to a projector.

2. Related Art

A projector which includes a reflection type liquid crystal panel such as LCOS (liquid crystal on silicon) as a reflection type light modulation device for modulation of entering light is known (for example, see JP-A-2009-36819).

The projector disclosed in JP-A-2009-36819 has three reflection type liquid crystal panels for processing three color lights in red, green, and blue, respectively, to combine the color lights modulated by the corresponding reflection type liquid crystal panels by using a color synthesize optical device and project the combined light toward a screen via a projection lens.

The projector shown in JP-A-2009-36819 has a cooling structure constructed as described below for cooling the three reflection type light modulation devices, for example.

The cooling structure of the projector includes three duct members each of which has an individual channel associated with the corresponding one of the three reflection type light modulation devices. In this arrangement, air can be supplied to the respective reflection type light modulation devices through the corresponding duct members.

According to this cooling structure, however, the necessity of equipping the three duct members increases the entire size of the cooling structure, and thus makes it difficult to save the internal space of the projector.

SUMMARY

An advantage of some aspects of the invention is to provide a technology capable of solving at least a part of the aforementioned problems and the invention can be implemented as the following forms or application examples.

Application Example 1

A projector according to this application example of the invention includes: a plurality of reflection type light modulation devices each of which modulates a corresponding color light of plural color lights; a color synthesize optical device which has a plurality of light entrance side end surfaces receiving the corresponding color lights modulated by the plural reflection type light modulation devices and a crossing end surface crossing the light entrance side end surfaces to combine the received color lights; a heat sink which has a base attached to the corresponding reflection type light modulation device, and a fin protruding from the base and extending in a direction crossing the crossing end surface; and a duct member disposed at a position opposed to the crossing end surface to supply introduced air toward the heat sink. The duct member includes a first outlet section disposed opposed to the fin such that the introduced air can be supplied toward the base through the first outlet section, and a second outlet section through which the introduced air is supplied in the extending direction of the fin.

According to this structure, air introduced into the duct member is supplied to the heat sink from the first outlet section and the second outlet section. That is, air flowing in the direction toward the base and air flowing in the direction along the fins are both supplied to the heat sink. In this case, air reaches the entire surfaces of the base and the fin. Moreover, the air supplied to the base has high wind pressure.

Therefore, the heat sink, and thus the reflection type light modulation device to which the heat sink is attached can be efficiently cooled.

The duct member is disposed opposed to the crossing end surface, and the fin of the heat sink extends in the direction crossing the crossing end surface. According to this arrangement, the duct member is disposed in the area inside the projector as an area which often becomes a dead space. Also, air can reach the heat sink without detour.

Accordingly, reduction of the size of the duct member, and thus reduction of the size of the projector, and efficient cooling for the plural reflection type light modulation devices can be both achieved.

Application Example 2

It is preferable that the plural reflection type light modulation devices in the projector of the above application example include first, second, and third reflection type light modulation devices each of which modulates a corresponding color light of three color lights. In this case, the second reflection type light modulation device is disposed between the optical path of light entering the first reflection type light modulation device and the optical path of light entering the third reflection type light modulation device. In addition, the duct member has the first outlet section corresponding to the heat sinks attached to the first and third reflection type light modulation devices but does not have the first outlet section corresponding to the heat sink attached to the second reflection type light modulation device.

According to this structure, the plural reflection type light modulation devices include the first, second, and third reflection type light modulation devices for modulating the three color lights in red, green, and blue, for example. The second reflection type light modulation device is disposed between the optical path of the light entering the first reflection type light modulation device and the optical path of the light entering the third reflection type light modulation device. The duct member has the first outlet section corresponding to the heat sinks attached to the first reflection type light modulation device and the third reflection type light modulation device, but does not have the first outlet section corresponding to the heat sink attached to the second reflection type light modulation device. In this case, the elimination of the first outlet section from the space opposed to the heat sink attached to the second reflection type light modulation device allows other components to be disposed therein, and allows the optical paths of the lights traveling toward the first and third reflection type light modulation devices to be positioned close to the second reflection type light modulation device.

For example, optical components such as a lens for reducing loss of light and a polarization element can be disposed on the optical paths of the lights traveling toward the first and third reflection type light modulation devices. Thus, the projector can project high-quality images while achieving efficient cooling for the first and third reflection type light modulation devices and size reduction of these devices.

Application Example 3

It is preferable that the first outlet section in the projector of the above application example is disposed at a longer distance from the color synthesize optical device than the distance of the second outlet section from the color synthesize optical device.

According to this structure, the first outlet section is disposed at the longer distance from the color synthesize optical device than the corresponding distance of the second outlet section. In this arrangement, the first outlet section is not provided at a position close to the color synthesize optical device in the space opposed to each of the heat sinks attached to the first and third reflection type light modulation devices. Thus, the components provided around the color synthesize optical device such as a projection lens for enlarging and projecting color light combined by the color synthesize optical device and other optical devices can be disposed in this space with high space efficiency. Accordingly, the projector can be further made compact and project images having higher optical quality while achieving efficient cooling for the reflection type light modulation devices.

Application Example 4

It is preferable that the duct member in the projector of the above application example has an introduction duct portion through which air is introduced into the projector, and a duct main body which disperses the air introduced through the introduction duct portion into a plurality of channels. In this case, the duct main body has a plurality of air supply ducts forming the plural channels through which air is supplied to the heat sinks, and at least one of the plural air supply ducts communicates with the first outlet section and the second outlet section.

According to this structure, the duct member has the introduction duct portion and the duct main body. The duct main body has the plural air supply ducts forming the plural channels through which air is supplied to the heat sinks. In this case, the air introduced through the introduction duct portion is separated into plural parts flowing through the plural channels by the air supply ducts of the duct main body, and supplied to the plural heat sinks. Moreover, at least one of the plural air supply ducts communicates with the first outlet section and the second outlet section. Thus, the reflection type light modulation device to which the heat sink receiving the air from the two outlet sections is attached can be efficiently cooled.

Accordingly, the plural heat sinks, and thus the plural reflection type light modulation devices to which the heat sinks are attached can be cooled by the simple structure and the decreased number of the parts. Therefore, the projector can be made compact and manufactured at low cost while achieving efficient cooling for the plural reflection type light modulation devices.

Application Example 5

It is preferable that the duct main body extends along the crossing end surface, and that the introduction duct portion introduces air in a direction crossing the crossing end surface toward the duct main body in the projector of the above application example.

According to the structures of the duct main body and the introduction duct portion constructed as above, the air introduced through the introduction duct portion into the duct main body is dispersed in directions along the crossing end surface after collision with the inner surface of the duct main body, and is supplied to the respective air supply ducts with a good balance. Accordingly, the plural heat sinks, and thus the plural reflection type light modulation devices can be cooled with a good balance.

In case of a structure of the introduction duct portion which introduces air into the duct main body in the direction along the crossing end surface, for example, air easily flows toward a particular air supply duct of the plural air supply ducts. Thus, a complicated rib or the like for controlling the flow amount of the air supplied to the respective air supply ducts needs to be provided within the duct main body. Moreover, there is a possibility that the complicated rib or the like thus provided causes a part of the introduced air to stay within the duct main body and thus prevents effective use of the air for cooling.

According to this application example of the invention having the above structure, however, air flows to the respective air supply ducts with a preferable balance. In this case, the structure of the rib or the like, and thus the structure of the duct main body become simple. Moreover, the introduced air can be effectively used for cooling of the reflection type light modulation devices.

Application Example 6

It is preferable that the three air supply ducts are provided in the projector of the above application example. In this case, the duct main body has a first channel linearly extending from an air introduction position toward one of the three air supply ducts. The two air supply ducts other than the one air supply duct toward which the first channel extends communicate with the first channel at the same position in the flow direction of the first channel. The air introduction position of the introduction duct portion almost coincides with the communication position between the first channel and the other two air supply ducts.

When the other two air supply ducts of the three air supply ducts are disposed at positions different from the air introduction position and at the same position in the flow direction of the first channel, the following problems may arise.

Air flowing inside the duct main body is dispersed along the plane parallel with the crossing end surface after collision with the inner surface of the duct main body. However, the dispersed air is forced into flowing along the first channel while regulated by the inner surface of the duct main body. Since the other two air supply ducts communicate with the first channel at the same position in the flow direction of the first channel, the air flowing along the first channel is chiefly supplied to the other two air supply ducts in the course of flow. In this case, the flow amount of air flowing toward the remaining one air supply duct decreases, whereby the cooling efficiency for the corresponding reflection type light modulation device lowers.

According this application example of the invention, however, the other two air supply ducts communicate with the first channel at the position almost coinciding with the air introduction position and at the same position in the flow direction of the first channel. In this arrangement, the air flowing inside the duct main body collides with the inner surface of the duct main body and disperses along the plane parallel with the crossing end surface. Then, the dispersed air is supplied to the three air supply ducts with a good balance without supply of an excessively large amount of the air to any particular duct of the air supply ducts. Accordingly, the three heat sinks, and thus the three reflection type light modulation devices can be cooled with a further preferable balance.

Application Example 7

It is preferable that the three air supply ducts are provided in the projector of the above application example. In this case, the duct main body has a first channel linearly extending from an air introduction position toward one of the three air supply ducts. The two air supply ducts other than the one air supply duct toward which the first channel extends communicate with the first channel at different positions in the flow direction of the first channel.

According to this structure, the other two air supply ducts of the three air supply ducts communicate with the first channel at different positions in the flow direction of the first channel.

In this arrangement, the air introduced through the introduction duct portion into the duct main body and flowing along the first channel can be sequentially supplied to the three air supply ducts with a good balance without supply of the most part of the air toward the other two air supply ducts. Thus, the three reflection type light modulation devices can be cooled with a good balance.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projector according to a first embodiment is hereinafter described with reference to the drawings.

The projector in this embodiment modulates light emitted from a light source according to image information, and projects the modulated light on a screen or the like.

Figure 1:
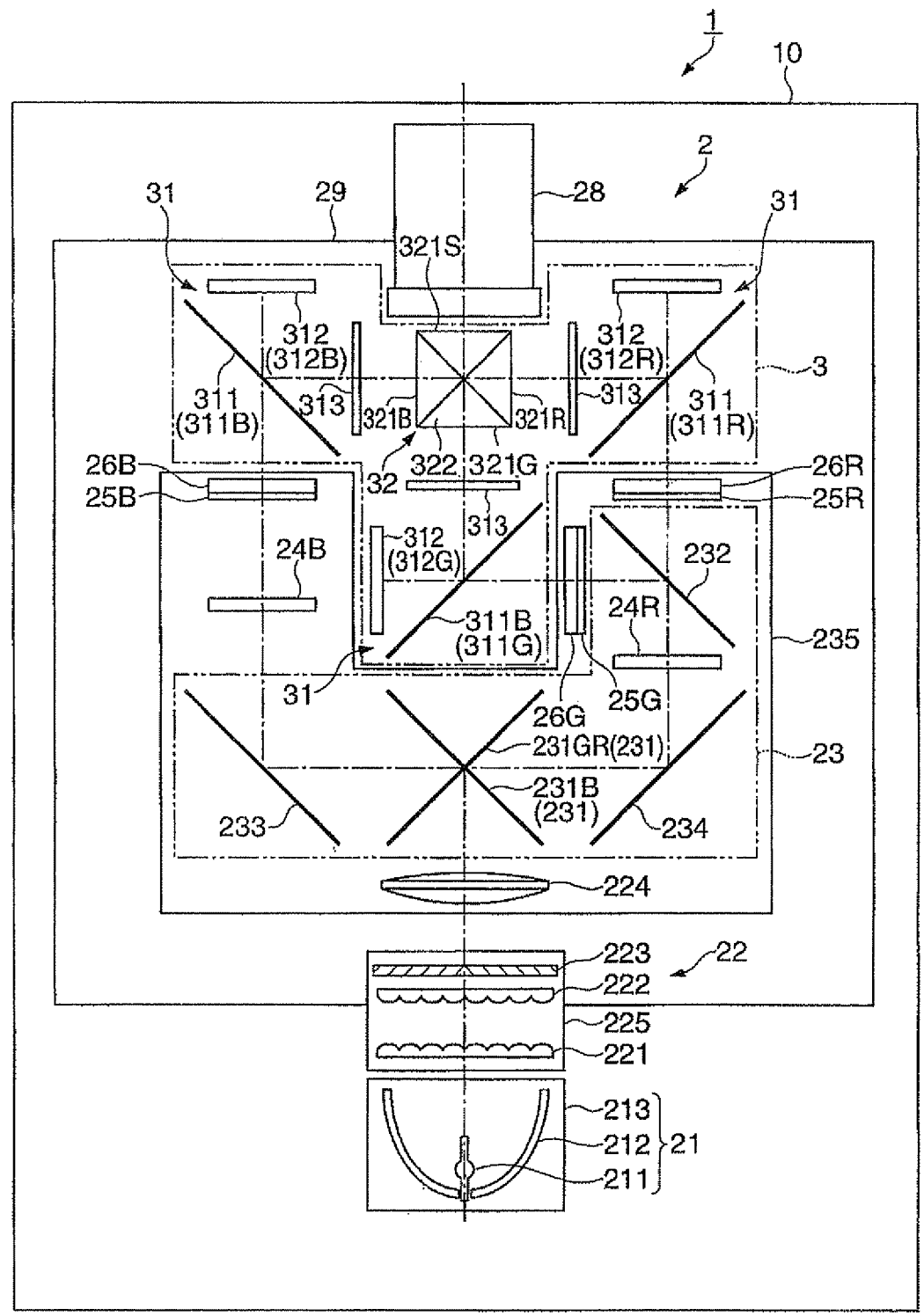
FIG. 1 schematically illustrates the general structure of a projector according to a first embodiment.

FIG. 1 schematically illustrates the general structure of a projector 1 according to this embodiment.

As illustrated in FIG. 1, the projector 1 includes an optical unit 2 having a light source device 21, a duct member 5 (see FIG. 2), and an external housing 10 accommodating these components. The projector 1 further includes a controller, a power source device for supplying power to the light source device 21 and the controller, a cooling fan for cooling the interior of the projector 1, and others as components accommodated within the external housing 10 and not shown in the figure.

The controller has a CPU (central processing unit), a ROM (read only memory), a RAM (random access memory) and others to function as a computer. The controller controls the operation of the projector 1 such as control associated with projection of images.

Structure of Optical Unit

The optical unit 2 performs optical processing for light emitted from the light source device 21 and projects images after the processing under the control of the controller.

As illustrated in FIG. 1, the optical unit 2 includes an integrator illumination system 22, a color separation device 23, relay lenses 24R and 24B, polarization plates 25R, 25G, and 25B, collimating lenses 26R, 26G, and 26B, an optical device 3, a projection lens 28, and a holding unit 29 for holding these optical components, as well as the light source device 21.

The light source device 21 includes a discharge-type light source 211 constituted by an extra-high pressure mercury lamp or a metal halide lamp, for example, a reflector 212, and a light source housing 213 which accommodates the light source 211 and the reflector 212. The light source device 21 equalizes the emission direction of the light emitted from the light source 211 by using the reflector 212, and supplies the equalized light toward the integrator illumination system 22.

The integrator illumination system 22 includes a first lens array 221, a second lens array 222, a polarization converting element 223, a stacking lens 224, and an illumination housing 225 which accommodates the first lens array 221, the second lens array 222, and the polarization converting element 223. The stacking lens 224 is contained in a color separation housing 235 described later.

The first lens array 221 has a plurality of small lenses arranged in matrix to divide the light emitted from the light source device 21 into a plurality of partial lights. The second lens array 222 has a structure substantially similar to that of the first lens array 221 to stack the partial lights on the surfaces of reflection type light modulation devices 312 described later in cooperation with the stacking lens 224.

The polarization converting element 223 equalizes randomly polarized lights received from the second lens array 222 into first linearly polarized lights to be processed by the reflection type light modulation devices 312.

The color separation device 23 includes a cross dichroic mirror 231, a G light reflection dichroic mirror 232, reflection mirrors 233 and 234, and a color separation housing 235 which accommodates these optical components to separate the lights received from the integrator illumination system 22 into three color lights of red light (hereinafter referred to as "R light"), green light (hereinafter referred to as "G light"), and blue light (hereinafter referred to as "B light").

The cross dichroic mirror 231 has a B light reflection dichroic mirror 231B and a GR lights reflection dichroic mirror 231GR as two optical components disposed in an X shape. The cross dichroic mirror 231 reflects the B light contained in the lights received from the integrator illumination system 22 by using the B light reflection dichroic mirror 231B, and reflects the G light and the R light by using the GR lights reflection dichroic mirror 231GR to separate the received lights.

The B light reflected by the B light reflection dichroic mirror 231B and again reflected by the reflection mirror 233 passes through the relay lens 24B, and travels toward the polarization plate 25B. On the other hand, the G light and R light reflected by the GR lights reflection dichroic mirror 231GR and again reflected by the reflection mirror 234 passes through the relay lens 24R, and travels toward the G light reflection dichroic mirror 232.

The G light reflection dichroic mirror 232 reflects the G light contained in the received G and R lights and transmits the R light to separate the received lights.

The G light reflected by the G light reflection dichroic mirror 232 is supplied to the polarization plate 25G. The R light transmitted by the G light reflection dichroic mirror 232 is supplied to the polarization plate 25R.

The relay lens 24B has a function of efficiently guiding the B light reflected by the reflection mirror 233 toward the third reflection type light modulation device 3123 described later. Similarly, the relay lens 24R has a function of efficiently guiding the R light reflected by the reflection mirror 234 toward the first reflection type light modulation device 312R described later. The relay lenses 24B and 24R are accommodated in the color separation housing 235.

The polarization plates 25R, 25G, and 25B are affixed to the collimating lenses 26R, 26G, and 26B, respectively, to increase the contrast of an image to be projected. The polarization plates 25R, 25G, and 25B transmit the first linearly polarized lights in the respective colors received from the color separation device 23, and absorb second linearly polarized lights crossing the first linearly polarized lights substantially at right angles and released as lights whose polarization direction has not been equalized by the polarization converting element 223.

The collimating lenses 26R, 26G, and 26B are so designed as to convert the respective color lights separated by the color separation device 23 into substantially collimated lights for illuminating the reflection type light modulation devices 312. The collimating lenses 26R, 26G, and 26B are accommodated in the color separation housing 235 where the polarization plates 25R, 25G, and 25B are contained.

Structure of Optical Device

Figure 2:
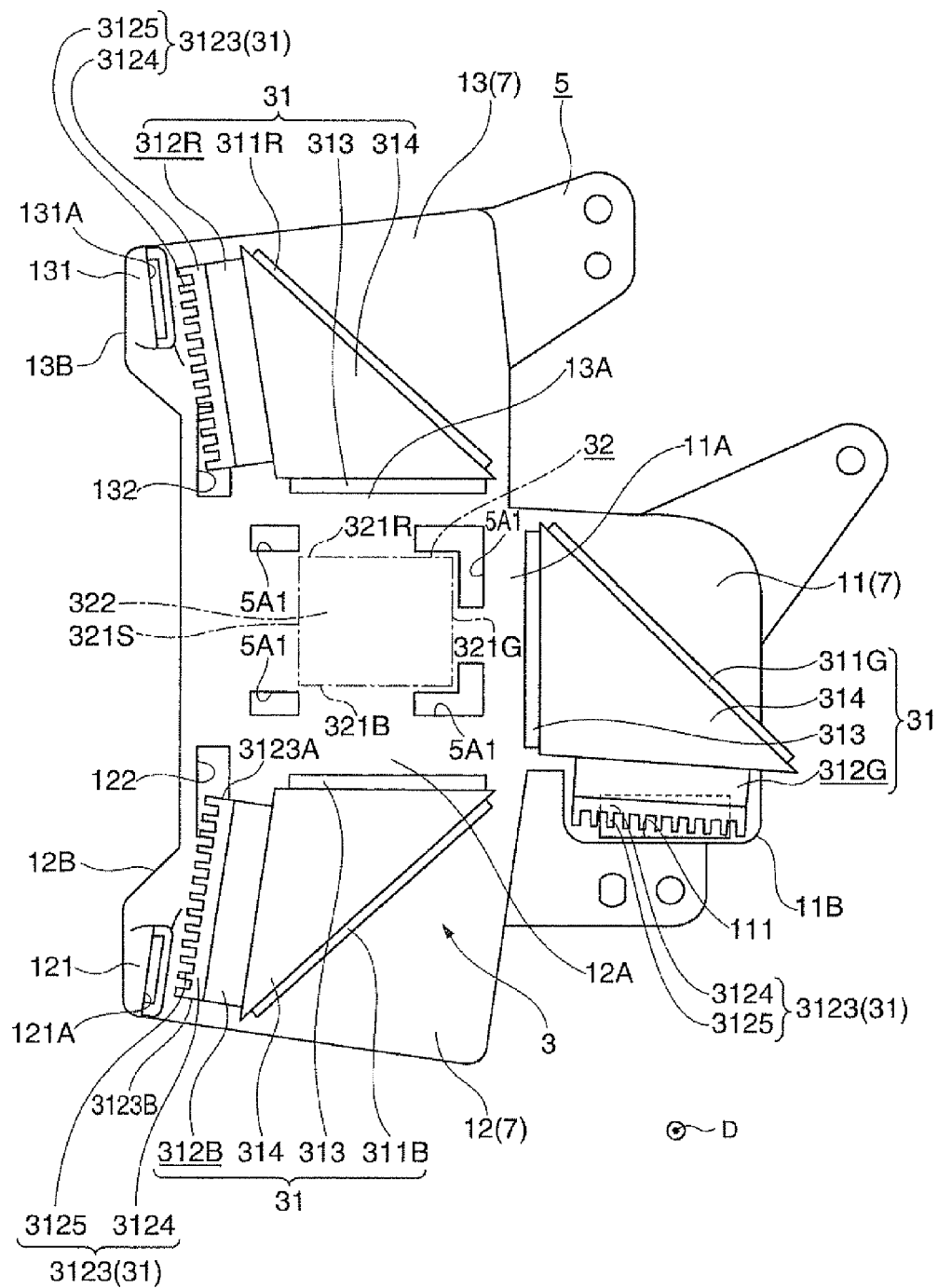
FIG. 2 is a plan view illustrating an optical device and a duct member according to the first embodiment.

FIG. 2 is a plan view of an optical device 3 and the duct member 5.

As illustrated in FIGS. 1 and 2, the optical device includes modulation units 31 provided for the three color lights for each, and a cross dichroic prism 32 as a color synthesize optical device. The optical device 3 modulates the respective color lights separated by the color separation device 23 according to image information, and combines the modulated color lights.

Figure 3:
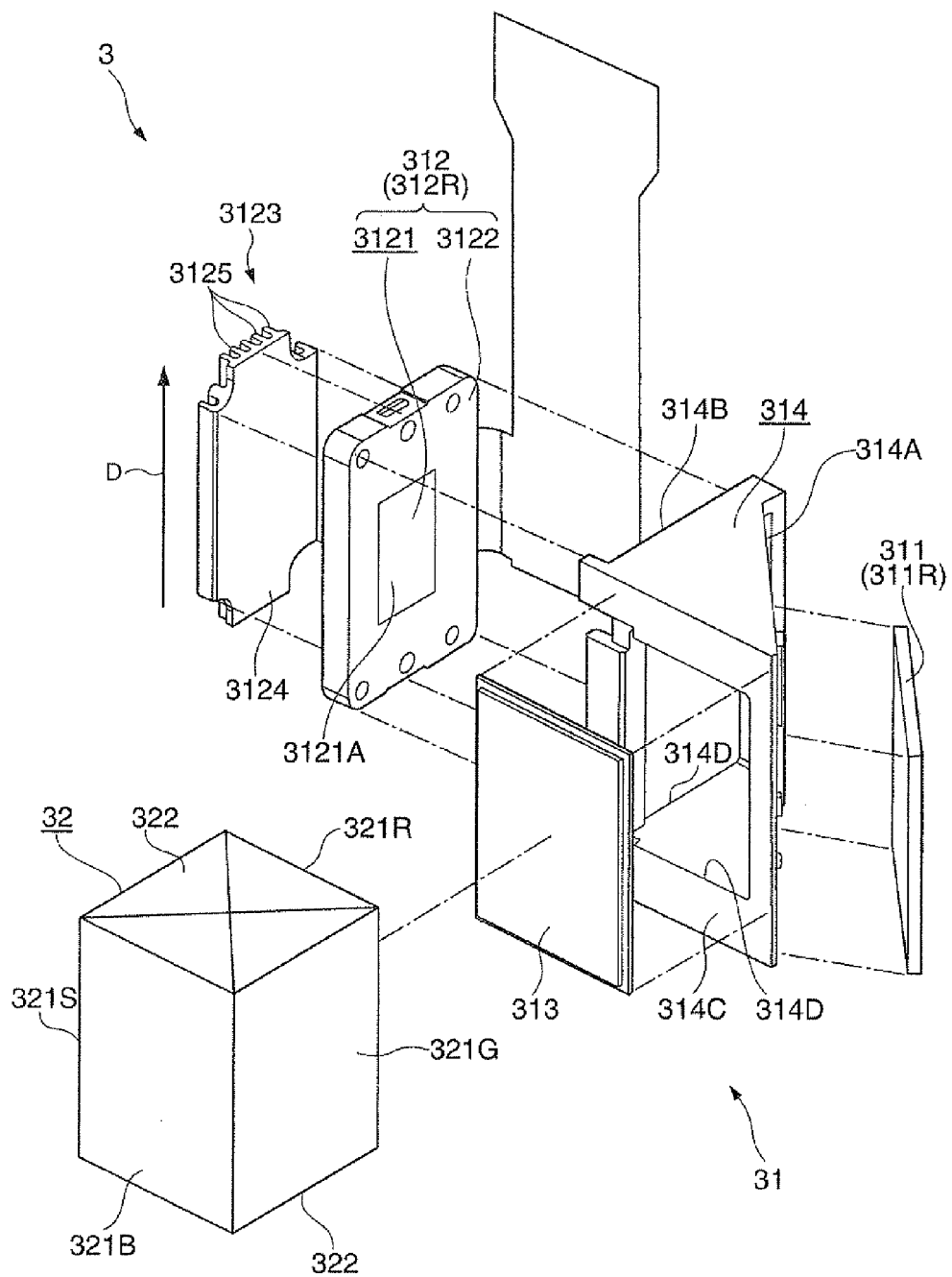
FIG. 3 is a perspective view illustrating a modulation unit for R light and a cross dichroic prism in a disassembled condition according to the first embodiment.

FIG. 3 is a perspective view illustrating the modulation unit 31 for R light and the cross dichroic prism 32 included in the optical device 3 in a disassembled condition.

Each of the three modulation units 31 is similarly constructed, including a reflection type polarization plate 311, the reflection type light modulation device 312, a polarization plate 313, a support body 314, and a heat sink 3123 as illustrated in FIGS. 2 and 3.

The reflection type polarization plates 311 are constituted by three reflection type polarization plates 311R, 311G, and 311B for processing the R light, G light, and B light, respectively. As illustrated in FIG. 1, each of the reflection type polarization plates 311 is supported by the support body 314 in such a position as to be inclined to the optical axis of entering light substantially at 45 degrees.

Each of the reflection type polarization plates 311 has a wire grid type structure which has a number of small linear ribs made of aluminum or the like and arranged in parallel with each other on a glass substrate. In this case, the reflection type polarization plate 311 transmits polarized light having the polarization direction perpendicular to the extending direction of the linear ribs, and reflects polarized light having the polarization direction parallel with the extending direction of the linear ribs.

The reflection type polarization plates 311 in this embodiment transmit the first linearly polarized light equalized by the polarization converting element 223, and reflect the second linearly polarized light. A retardation plate may be provided on the upstream side of each of the reflection type polarization plates 311 along the optical path such that the reflection type polarization plate 311 can transmit the second linearly polarized light and reflect the first linearly polarized light.

Structure of Reflection Type Light Modulation Device

The reflection type light modulation devices 312 are constituted by three units of first reflection type light modulation device 312R, second reflection type light modulation device 312G, and third reflection type light modulation device 312B for processing the R light, G light, and B light, respectively. As illustrated in FIG. 3, each of the reflection type light modulation devices 312 has a reflection type liquid crystal panel 3121 and a holding frame 3122. Each of the reflection type light modulation devices 312 is held by the support body 314, and is positioned substantially perpendicular to the optical axis of the light having passed through the reflection type polarization plate 311 as illustrated in FIG. 1.

The reflection type liquid crystal panel 3121 has so-called LCOS (liquid crystal on silicon) structure which contains a liquid crystal layer sandwiched between opposed substrates. This structure includes reflection pixel electrodes provided in matrix on the silicon substrate as one of the substrates, to which electrodes switching elements are connected, and opposed electrodes provided on the other substrate (transparent substrate).

Voltage is applied between the reflection pixel electrodes and the opposed electrodes in response to a drive signal sent from the controller to control the orientation conditions of the liquid crystals of the reflection type liquid crystal panel 3121. Then, the first linearly polarized light having passed through the reflection type polarization plate 311 and reached the reflection type liquid crystal panel 3121 is modulated thereat and reflected thereby toward the reflection type polarization plate 311. The respective color lights modulated by the reflection type liquid crystal panels 3121 and reflected by the reflection type polarization plates 311 are supplied to the corresponding polarization plates 313.

The holding frame 3122 is a rectangular component in the plan view for holding the reflection type liquid crystal panel 3121, and is made of heat conductive material such as metal.

The polarization plate 313 is supported by the support body 314, and is positioned substantially perpendicular to the optical axis of the corresponding color light reflected by the reflection type polarization plate 311 as illustrated in FIG. 1.

The polarization plate 313 transmits polarized light having substantially the same polarization direction as that of the second linearly polarized light after modulated by the reflection type liquid crystal panel 3121 and reflected by the reflection type polarization plate 311. That is, this embodiment employs the dual structure which has both the reflection type polarization plate 311 and the polarization plate 313. In this case, even when a polarized light component other than the desired linearly polarized light is reflected by the reflection type polarization plate 311, the polarization plate 313 removes this polarized light component.

The support body 314 supports the reflection type polarization plate 311, the reflection type light modulation device 312, and the polarization plate 313.

As illustrated in FIG. 3, the support body 314 is a hollow triangle-pole-shaped component having a substantially isosceles right-angled triangular cross section, and has a first side surface 314A as a slope, and a second side surface 314B and a third side surface 314C forming the vertical angle. An opening 314D is formed on each of the side surfaces 314A through 314C.

The first side surface 314A is a surface to which the reflection type polarization plate 311 is fixed. The second side surface 314B is a surface to which the reflection type light modulation device 312 is fixed. The third side surface 314C is a surface to which the polarization plate 313 is fixed.

Under the assembled condition of the respective components 311 through 313 fixed to the corresponding side surfaces 314A through 314C, the respective openings 314D are closed, in which condition the space inside the support body 314 is sealed. According to the arrangement in this embodiment, a surface 3121A of the reflection type liquid crystal panel 3121 is disposed within the sealed space, wherefore adhesion of dust to the surface 3121A is prevented. Accordingly, deterioration of a projection image caused by a shadow of dust adhering to the surface 3121A during image projection can be avoided.

The heat sink 3123 is made of heat conductive material such as metal. As illustrated in FIG. 3, the heat sink 3123 has a base 3124 having a rectangular plate shape in the plan view, and a plurality of fins 3125 protruding from the base 3124. The fins 3125 extend in the direction in which a pair of crossing end surfaces 322 (described later) of the cross dichroic prism 32 are opposed to each other, i.e., in the up-down direction as viewed in FIG. 3 (hereinafter referred to as "opposed direction D"). That is, the fins 3125 extend in the direction crossing the crossing end surfaces 322. In the following description, the upper side and the lower side as viewed in FIG. 3 correspond to "up" and "down", respectively.

The heat sink 3123 is attached in such a position that the base 3124 is disposed on the rear side of the holding frame 3122 (end surface side opposite to the surface 3121A of the reflection type liquid crystal panel 3121). The heat sink 3123 receives heat transmitted from the reflection type liquid crystal panel 3121 and the holding frame 3122, and releases the heat through the base 3124 and the plural fins 3125.

The cross dichroic prism 32 combines the color lights received from the respective modulation units 31.

The cross dichroic prism 32 has a rectangular parallelepiped shape formed by four rectangular prisms affixed to each other, and includes dielectric multilayer films on the interfaces of the affixed rectangular prisms.

The cross dichroic prism 32 has three light entrance side end surfaces 321R, 321G, and 321B receiving the color lights transmitted by the respective polarization plates 313, an exit side end surface 321S through which the combined color light is released, and a pair of the crossing end surfaces 322 crossing the light entrance side end surfaces 321R, 321G, and 321B.

More specifically, as illustrated in FIG. 3, the light entrance side end surfaces 321R, 321G, and 321B are disposed on three of the four surfaces extending in the opposed direction D. The light entrance side end surface 321R and the light entrance side end surface 321B are disposed opposed to each other. The light entrance side end surface 321G is connected with the edges of the light entrance side end surface 321R and the light entrance side end surface 321B. The exit side end surface 321S is disposed opposed to the light entrance side end surface 321G.

As illustrated in FIG. 1, the cross dichroic prism 32 is disposed in such a position that each of the light entrance side end surfaces 321R, 321G, and 321B is positioned substantially perpendicular to the optical axis of the corresponding color light having passed through the polarization plate 313. Thus, the optical device 3 is provided in such a condition that the cross dichroic prism 32 is surrounded by the respective light entrance side end surfaces 321R, 321G, and 321B of the three modulation units 31.

The second reflection type light modulation device 312G is disposed between the optical path of the light entering the first reflection type light modulation device 312R (hereinafter referred to as "first optical path") and the optical path of the light entering the third reflection type light modulation device 312B (hereinafter referred to as "second optical path"). More specifically, the first optical path is the optical path of the light reflected by the reflection mirror 234, while the second optical path is the optical path of the light reflected by the reflection mirror 233. The second optical path is positioned on the side where the heat sink 3123 attached to the second reflection type light modulation device 312G is disposed.

The cross dichroic prism 32 transmits the color light received from the polarization plate 313 for G light and reflects the color lights received from the polarization plates 313 for B light and R light to combine the respective color lights. The color light combined by the cross dichroic prism 32 is released through the exit side end surface 321S, and enlarged and projected by the projection lens 28. In the following description, the side where the combined color light is projected from the projection lens 28 corresponds to the "front surface side".

Structure of Duct Member

As illustrated in FIG. 2, the duct member 5 is disposed at the position opposed to the lower crossing end surface 322 of the cross dichroic prism 32 to guide air delivered from the cooling fan (not shown) toward the optical device 3.

Figure 4:
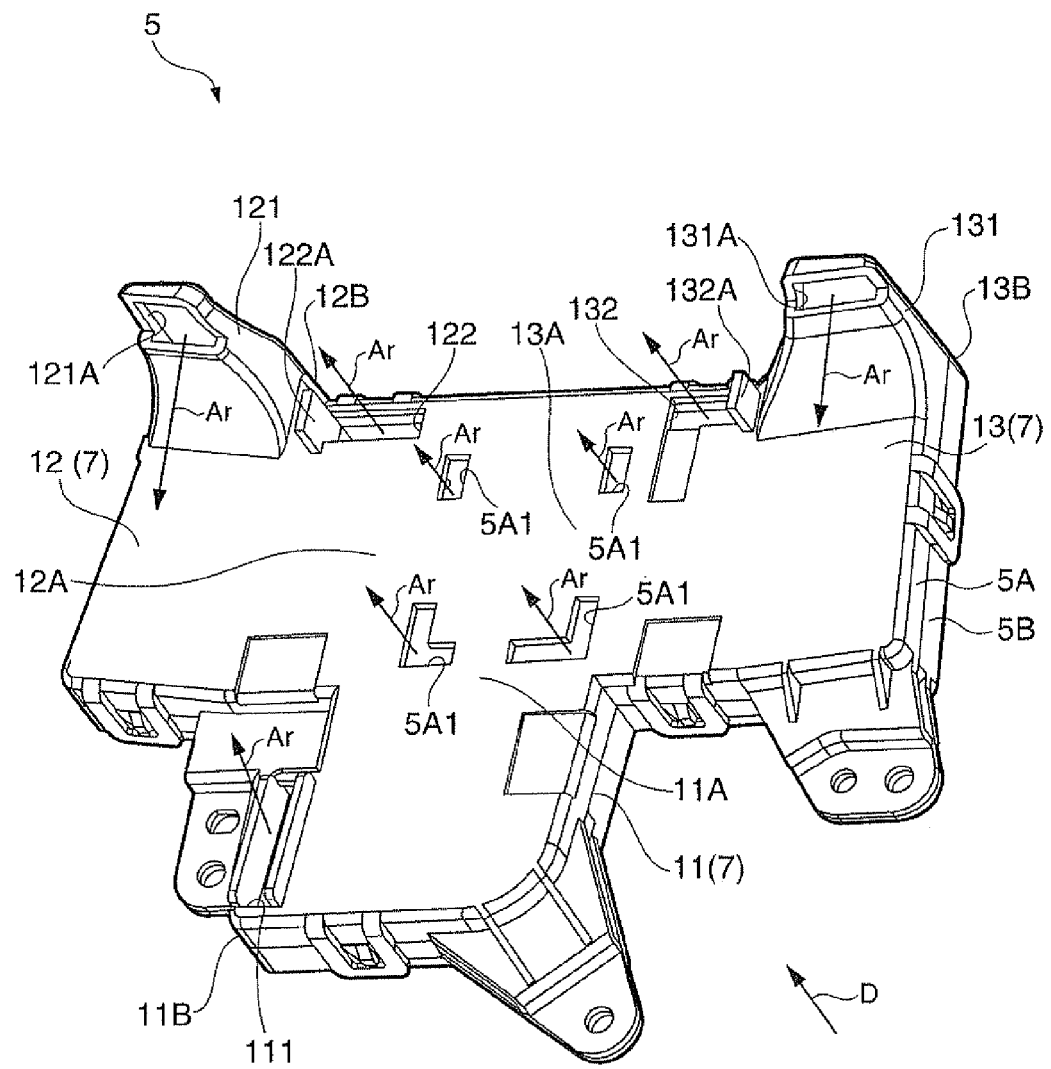
FIG. 4 is a perspective view of the duct member according to the first embodiment.
Figure 5:
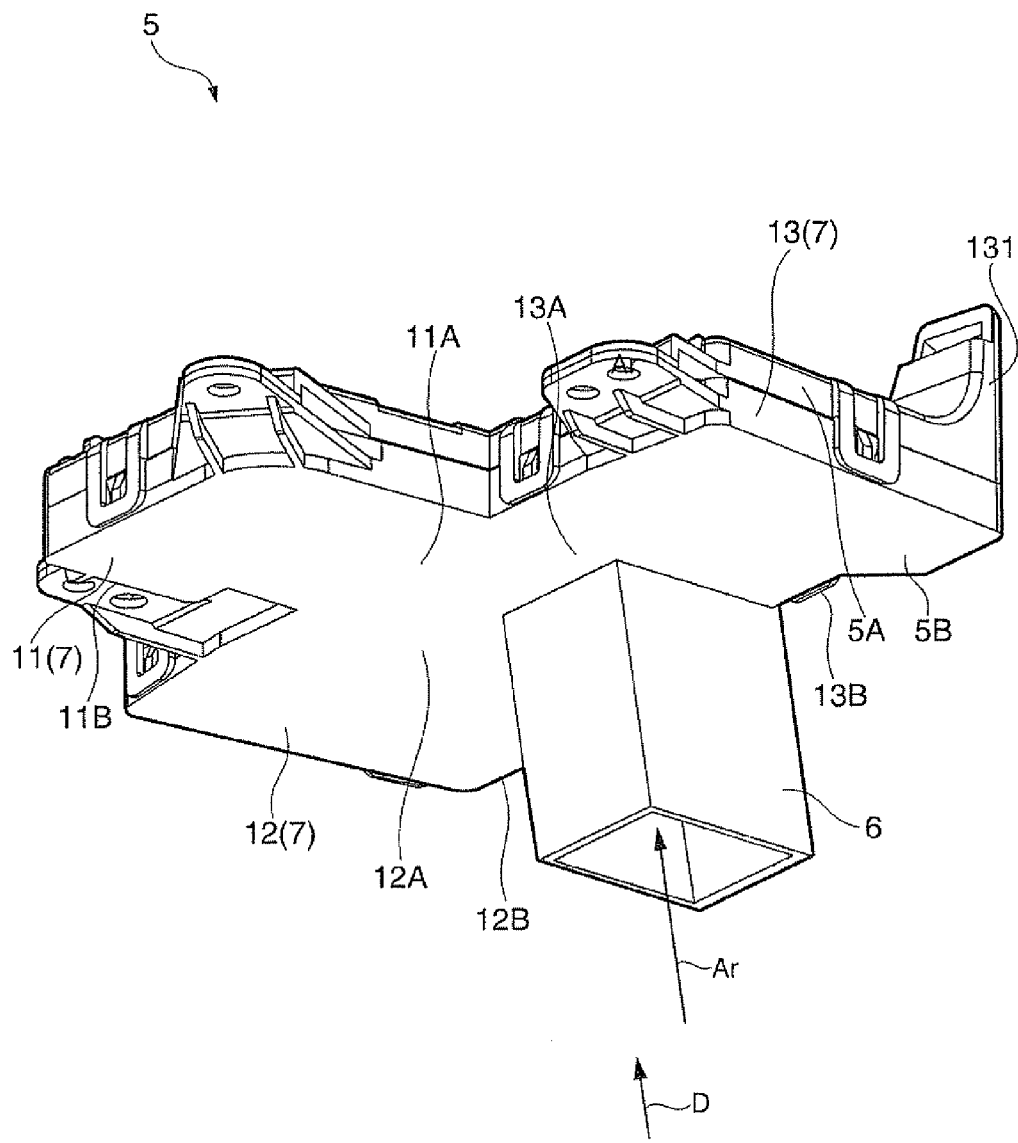
FIG. 5 is a perspective view of the duct member according to the first embodiment.

FIGS. 4 and 5 are perspective views of the duct member 5. More specifically, FIG. 4 is a perspective view of the duct member 5 as viewed from above, while FIG. 5 is a perspective view of the duct member 5 as viewed from below.

As illustrated in FIGS. 4 and 5, the duct member 5 has a first frame 5A forming the upper part, and a second frame 5B forming the lower part to constitute a hollow shape when both the frames 5A and 5B are combined.

Figure 6:
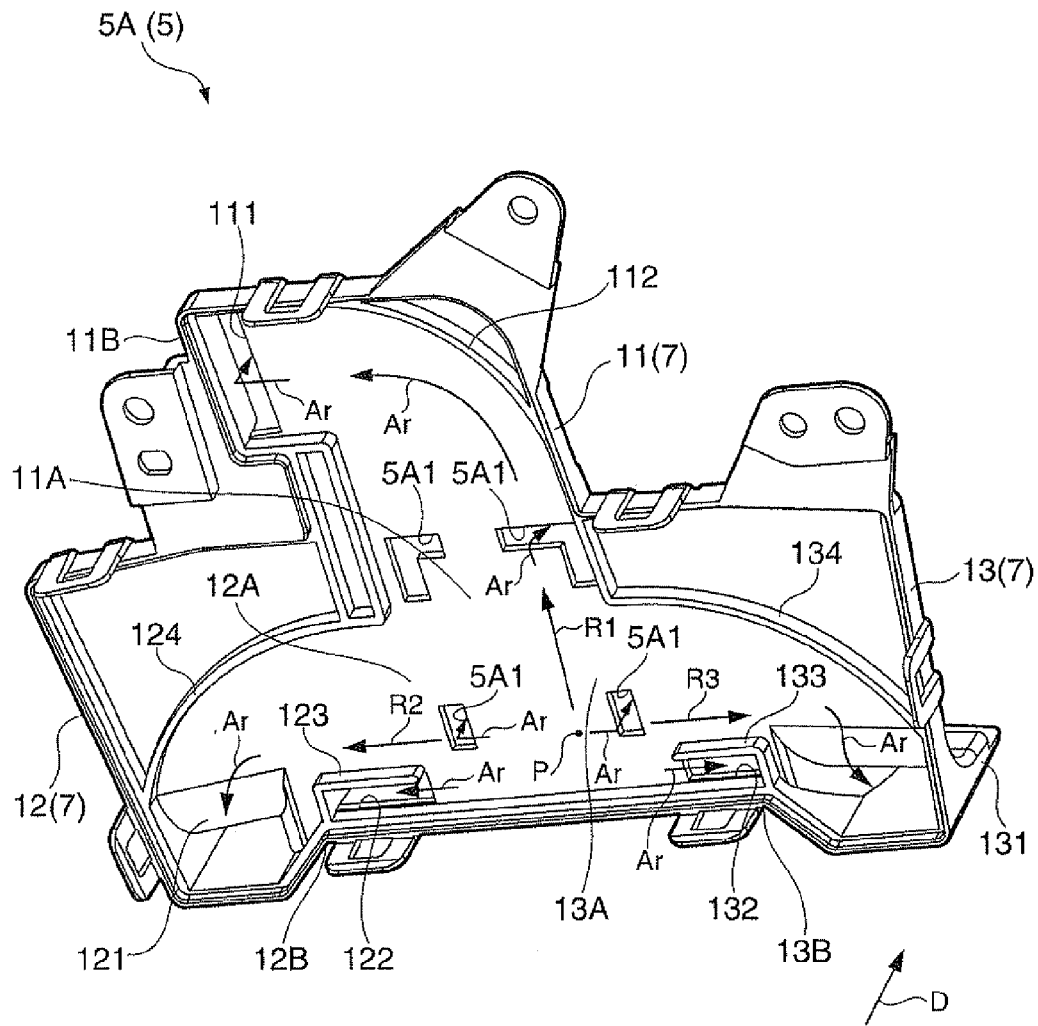
FIG. 6 is a perspective view of a first frame as viewed from the inside according to the first embodiment.
Figure 7:
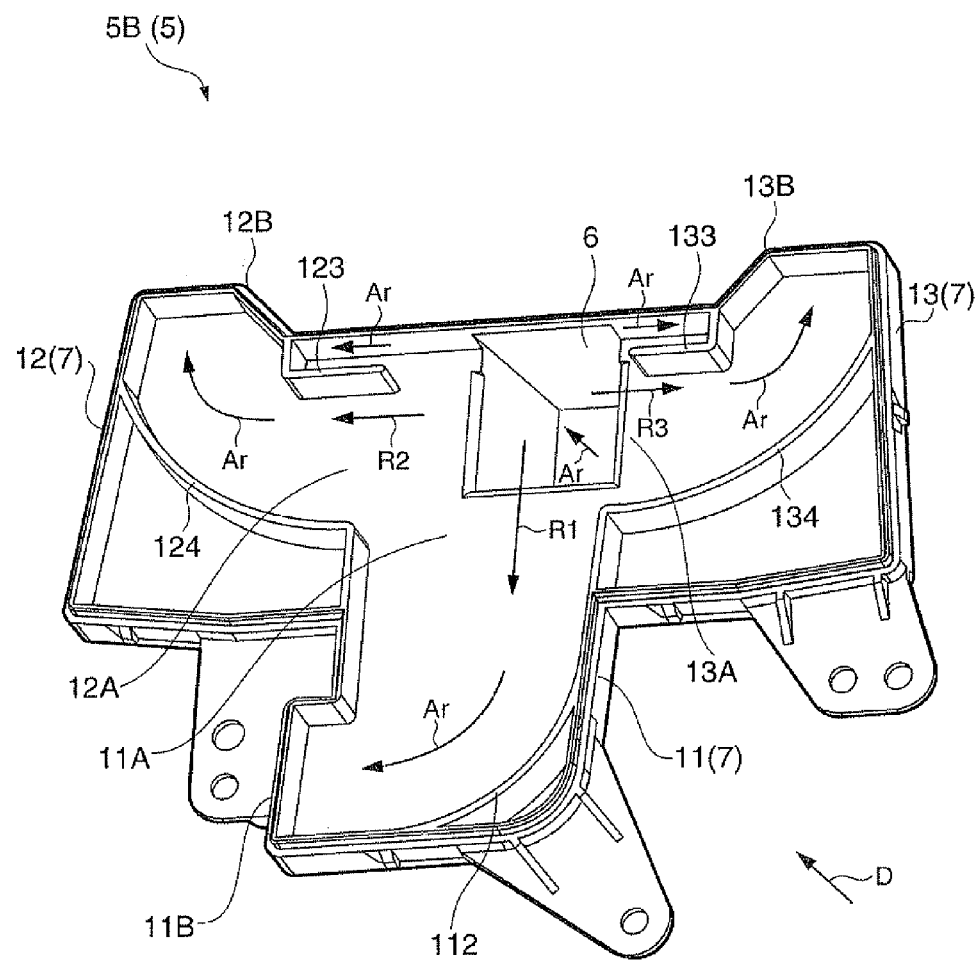
FIG. 7 is a perspective view of a second frame as viewed from the inside according to the first embodiment.

FIG. 6 is a perspective view of the first frame 5A as viewed from the inside. FIG. 7 is a perspective view of the second frame 5B as viewed from the inside.

As illustrated in FIGS. 4 through 7, the duct member 5 has an introduction duct portion 6 and a duct main body 7.

As illustrated in FIGS. 5 and 7, the introduction duct portion 6 disposed on the second frame 5B is an elongated and hollow component having a rectangular cross section and extended downward. The introduction duct portion 6 introduces air delivered from the cooling fan.

As illustrated in FIGS. 2 and 4 through 7, the duct main body 7 extends along the crossing end surface 322 (see FIG. 2).

The duct main body 7 has three air supply ducts (first through third air supply ducts 11 through 13) having one ends 11A, 12A, and 13A communicating with one another and the other ends 11B, 12B and 13B through which air is supplied to the three heat sinks 3123.

As illustrated in FIGS. 2 and 6, the first air supply duct 11 extends in a direction substantially perpendicular to the light entrance side end surface 321G in the plan view from the one end 11A, and is bended substantially at 90 degrees to reach the other end 11B. The one end 11A is disposed at the position corresponding to the position of the cross dichroic prism 32. The other end 11B is disposed at the position corresponding to the position of the second reflection type light modulation device 312G.

As illustrated in FIGS. 2, 4 and 6, a G side outlet port 111 connecting the inside and outside of the duct member 5 is formed on the first frame 5A at the other end 11B of the first air supply duct 11 at the position corresponding to the position of the second reflection type light modulation device 312G.

As illustrated in FIG. 2, the G side outlet port 111 is positioned below the heat sink 3123 attached to the second reflection type light modulation device 312G.

As illustrated in FIGS. 2 and 6, the second air supply duct 12 extends in a direction substantially perpendicular to the light entrance side end surface 321B in the plan view from the one end 12A, and is bended substantially at 90 degrees to reach the other end 12B. The one end 12A is disposed at the position corresponding to the position of the cross dichroic prism 32. The other end 12B is disposed at the position corresponding to the position of the third reflection type light modulation device 312B.

Figure 8:
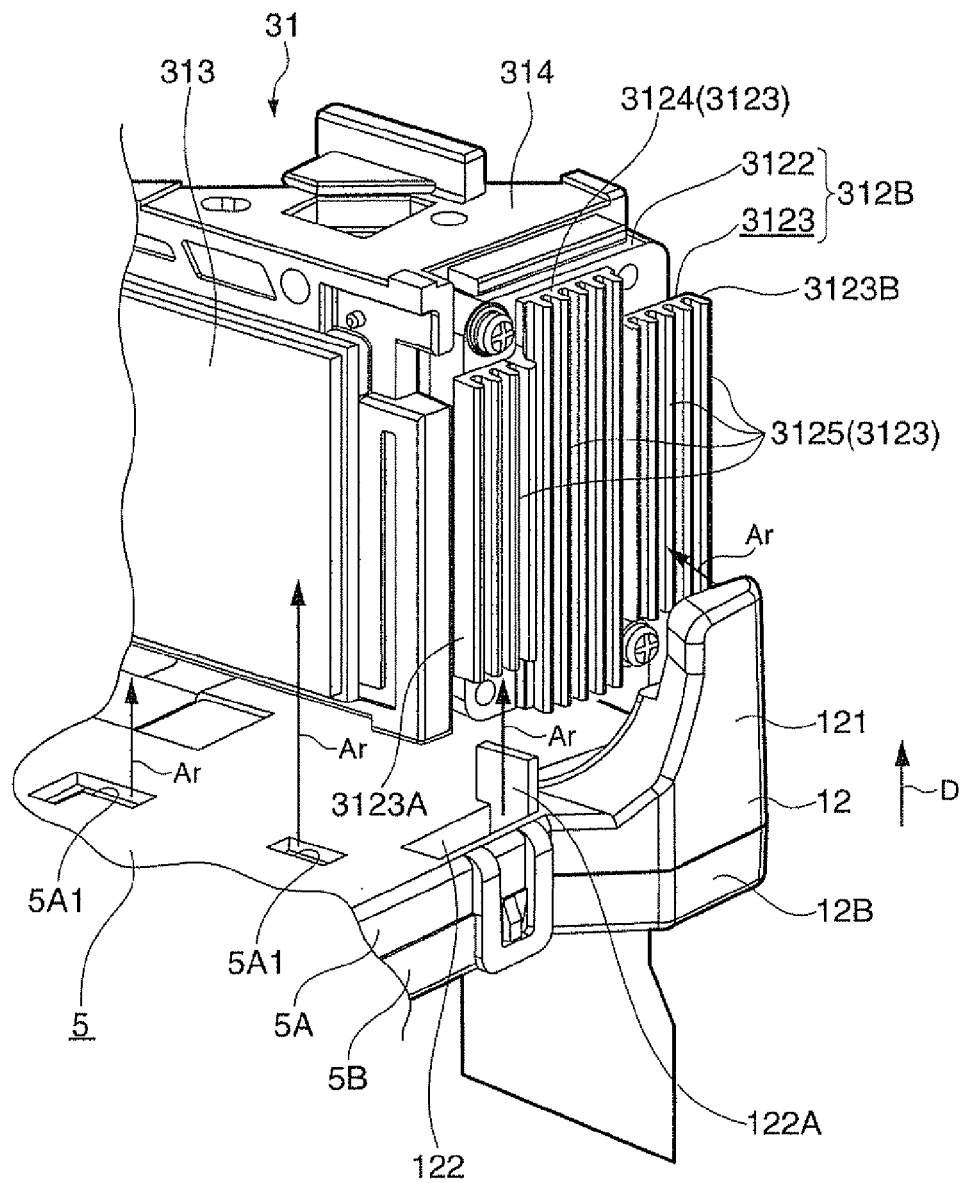
FIG. 8 is a perspective view illustrating a modulation unit for B light and a part of the duct member according to the first embodiment.
Figure 9:
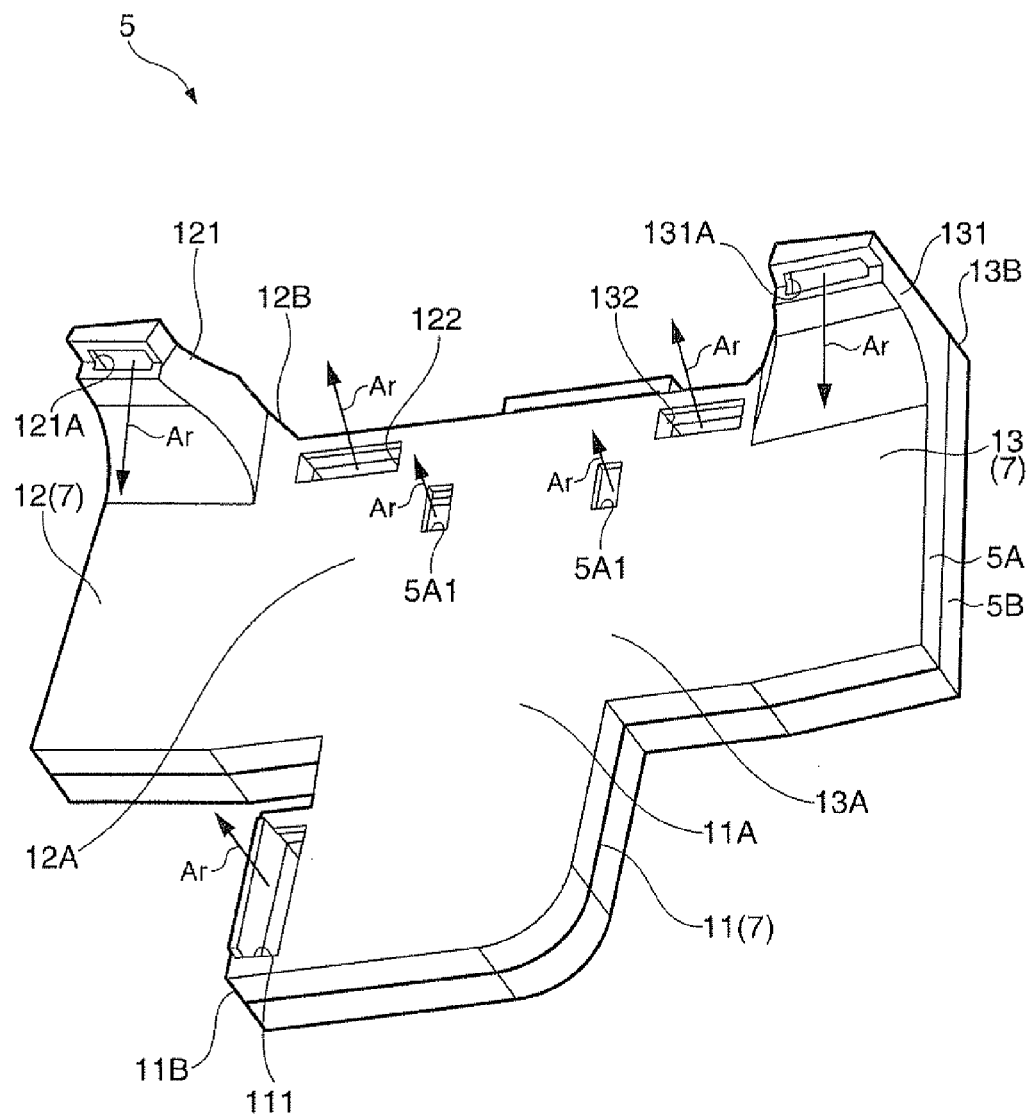
FIG. 9 illustrates the structure of a duct member according to a second embodiment.
Figure 10:
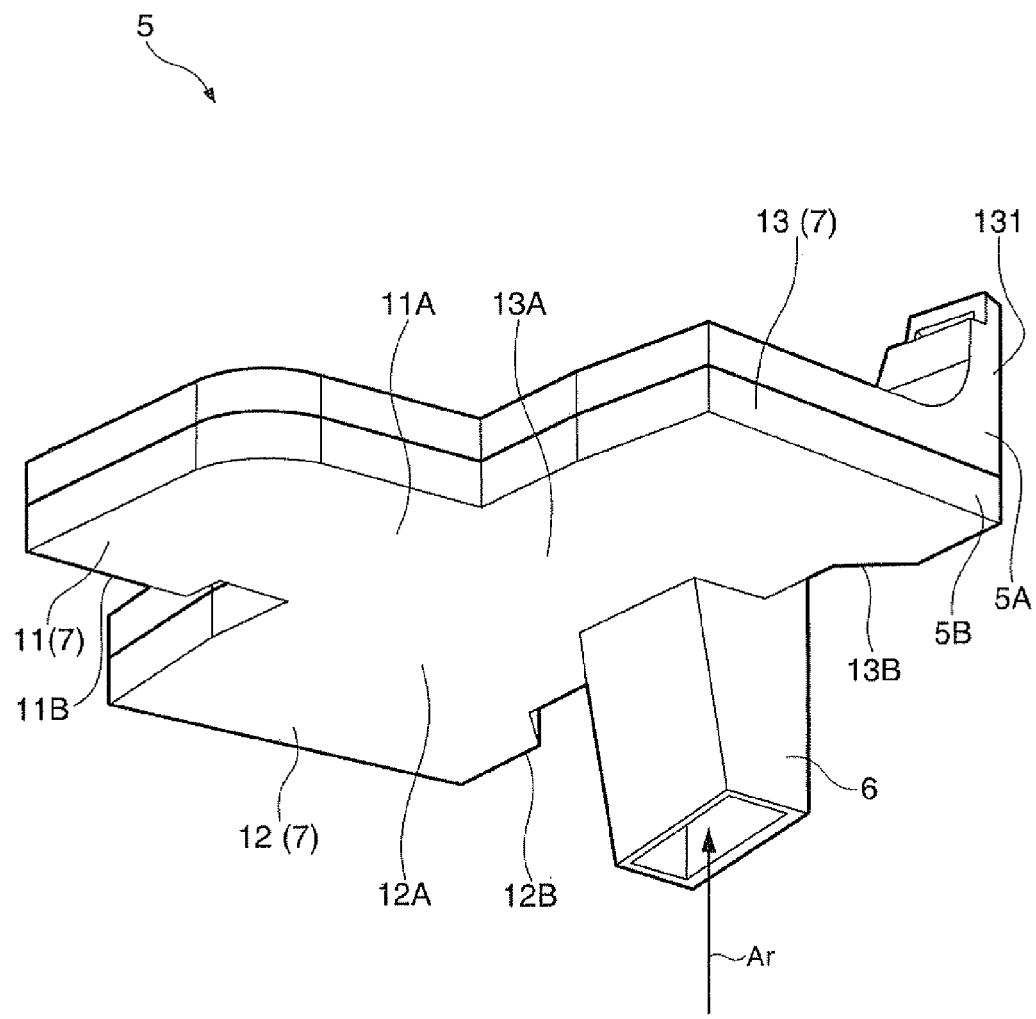
FIG. 10 illustrates the structure of the duct member according to the second embodiment.

FIG. 8 is a perspective view illustrating the modulation unit 31 for B light and a part of the duct member 5 as viewed from the front side.

As illustrated in FIGS. 2, 4, and 8, a first outlet section 121 and a second outlet section 122 are provided on the first frame 5A at the other end 12B of the second air supply duct 12 at the position corresponding to the position of the third reflection type light modulation device 312B.

As illustrated in FIGS. 2 and 8, the first outlet section 121 expands in the opposed direction D in such a position that the distal end of the first outlet section 121 faces to the heat sink 3123 attached to the third reflection type light modulation device 312B while avoiding mechanical interference with the third reflection type light modulation device 312B and the heat sink 3123 attached thereto. In addition, as illustrated in FIG. 2, the first outlet section 121 is disposed near an end 3123B of the heat sink 3123 on the side away from the cross dichroic prism 32 in the plan view.

As illustrated in FIGS. 2 and 4, a B side outlet port 121A connecting the inside and outside of the duct member 5 is provided on the first outlet section 121 at the position facing the fins 3125 of the heat sink 3123.

The second outlet section 122 is an opening which connects the inside and outside of the duct member 5, and is provided below the heat sink 3123. As illustrated in FIG. 2, the second outlet section 122 is disposed near an end 3123A of the heat sink 3123 opposite to the end 3123B in the plan view. Thus, the first outlet section 121 is positioned at a longer distance from the cross dichroic prism 32 than the corresponding distance of the second outlet section 122.

As illustrated in FIGS. 4 and 8, a rectifying rib 122A extending in the opposed direction. D is provided at the edge of the second outlet section 122 on the side close to the first outlet section 121.

The third air supply duct 13 is constructed similarly to the second air supply duct 12 such that the second and third air supply ducts 12 and 13 become symmetric with respect to the flow direction of a first channel R1 (described later, see FIG. 6) in the plan view. As illustrated in FIGS. 2 and 4, a first outlet section 131 (R side outlet port 131A) and a second outlet section 132 (rectifying rib 132A) similar to the first outlet section 121 (B side outlet port 121A) and the second outlet section 122 (rectifying rib 122A) are provided at the other end 13B of the third air supply duct 13.

Accordingly, the first outlet sections 121 and 131 corresponding to the first reflection type light modulation device 312R and the third reflection type light modulation device 312B are provided on the duct member 5. However, the first outlet section associated with the second reflection type light modulation device 312G is not equipped.

As illustrated in FIGS. 2, 4, and 8, exit side outlet sections 5A1 connecting the inside and outside of the duct member 5 are formed at the position corresponding to the position of the cross dichroic prism on the first frame 5A in such a condition as to surround the respective light entrance side end surfaces 321R, 321G, and 321B in the plan view.

Channels Inside Duct Member

The air channels inside the duct member 5 are now explained.

Initially, as illustrated in FIGS. 5 through 7, air Ar delivered from the cooling fan is introduced in a direction substantially perpendicular to the crossing end surface 322 (see FIG. 2) via the introduction duct portion 6 into the duct main body 7, and collides with the inner surface of the first frame 5A (this position of collision is hereinafter referred to as an introduction position P (see FIG. 6)).

Then, the introduced air Ar is dispersed in the direction along the crossing end surface 322 within the duct main body 7 after collision with the inner surface of the first frame 5A.

As illustrated in FIGS. 6 and 7, a part of the dispersed air Ar flows from the introduction position P through the first channel R1 linearly extending in the direction substantially perpendicular to the light entrance side end surface 321G (see FIG. 2) toward the first air supply duct 11.

As illustrated in FIGS. 4 and 6, a part of the air Ar flowing along the first channel R1 is supplied to the outside of the duct member 5 through the exit side outlet section 5A1 formed at the position corresponding to the position of the light entrance side end surface 321G (see FIG. 2). The air Ar coming from the exit side outlet section 5A1 flows in the opposed direction D through the area between the light entrance side end surface 321G and the polarization plate 313 for G light to cool the polarization plate 313 for G light.

As illustrated in FIGS. 6 and 7, the remaining part of the air Ar flowing along the first channel R1 is rectified toward the other end 11B by a curved rectifying rib 112 provided inside the first air supply duct 11, and supplied to the outside of the duct member 5 via the G side outlet port 111. The air Ar coming from the G side outlet port 111 flows in the opposed direction D, that is, in the extending direction of the fins 3125 of the heat sink 3123 (see FIG. 2) attached to the second reflection type light modulation device 312G to cool the second reflection type light modulation device 312G.

Accordingly, the first air supply duct 11 delivers the dispersed air Ar in the extending direction of the fins 3125 of the heat sink 3123 to cool the second reflection type light modulation device 312G to which the heat sink 3123 is attached.

On the other hand, as illustrated in FIGS. 6 and 7, another part of the dispersed air Ar flows from the introduction position P through a second channel R2 linearly extending in a direction substantially perpendicular to the light entrance side end surface 321B (see FIG. 2) toward the second air supply duct 12.

As illustrated in FIGS. 4, 6, and 8, a part of the air Ar flowing along the second channel R2 is supplied to the outside of the duct member 5 through the exit side outlet section 5A1 formed at the position corresponding to the position of the light entrance side end surface 321B (see FIG. 2). As illustrated in FIG. 8, the air Ar coming from the exit side outlet section 5A1 flows in the opposed direction D through the area between the light entrance side end surface 321B (see FIG. 2)

and the polarization plate 313 for B light to cool the polarization plate 313 for B light as illustrated in FIG. 8.

As illustrated in FIGS. 6 and 7, another part of the air Ar flowing along the second channel R2 is guided toward the second outlet section 122 by a guiding rib 123 provided inside the second air supply duct 12, and supplied to the outside of the duct member 5 via the second outlet section 122. As illustrated in FIG. 8, the air Ar coming from the second outlet section 122 flows in the opposed direction D, that is, in the extending direction of the fins 3125 of the heat sink 3123 attached to the third reflection type light modulation device 312B to cool the third reflection type light modulation device 312B.

As noted above, the second outlet section 122 is provided in the vicinity of the end 3123A of the heat sink 3123. Thus, the air Ar supplied to the outside of the duct member 5 via the second outlet section 122 flows toward the end 3123A of the heat sink 3123 as illustrated in FIG. 8.

Moreover, as illustrated in FIGS. 6 and 7, the remaining part of the air Ar flowing along the second channel R2 is rectified toward the first outlet section 121 by a curved rectifying rib 124 provided inside the second air supply duct 12, and supplied to the outside of the duct member 5 via the B side outlet port 121A as illustrated in FIG. 4. As illustrated in FIG. 8, the air Ar coming from the B side outlet port 121A flows toward the base 3124 of the heat sink 3123 to cool the third reflection type light modulation device 312B.

As mentioned above, the first outlet section 121 is disposed in the vicinity of the end 3123B of the heat sink 3123. Thus, the air Ar coming from the B side outlet port 121A is supplied toward the end 3123B of the heat sink 3123 as illustrated in FIG. 8.

Accordingly, the second air supply duct 12 supplies the introduced air Ar in the direction toward the base 3124 of the heat sink 3123 attached to the third reflection type light modulation device 312B, and in the extending direction of the fins 3125 of the heat sink 3123 to cool the third reflection type light modulation device 312B.

Moreover, as illustrated in FIGS. 6 and 7, a further part of the dispersed air Ar flows from the introduction position P along a third channel R3 extending in the direction opposite to the direction of the second channel R2 toward the third air supply duct 13.

The second air supply duct 12 and the third air supply duct 13 communicate with the first channel R1 at the same position (position almost coinciding with the introduction position P) in the flow direction of the first channel R1.

The air Ar flowing along the third channel R3 flows in a manner substantially similar to that of the air Ar flowing along the second channel R2 to cool the polarization plate 313 for R light and the first reflection type light modulation device 312R. More specifically, the air Ar coming from the exit side outlet section 5A1 formed at the position corresponding to the position of the light entrance side end surface 321R (see FIG. 2) cools the polarization plate 313 for R light. The air Ar coming from the first outlet section 131 (R side outlet port 131A) flows toward the base 3124 of the heat sink 3123, and the air Ar coming from the second outlet section 132 flows in the extending direction of the fins 3125, so as to cool the first reflection type light modulation device 312R.

Accordingly, the projector 1 in this embodiment offers the following advantages.

(1) Air flowing in the direction toward the base 3124 and air flowing in the direction along the fins 3125 are both supplied to each of the heat sinks 3123 attached to the first reflection type light modulation device 312R and the third reflection type light modulation device 312B. In this case, air reaches the entire surfaces of the base 3124 and the fins 3125. Moreover, the air supplied to the base 3124 has high wind pressure. Therefore, each of the heat sinks 3123, and thus each of the first reflection type light modulation device 312R and the third reflection type light modulation device 312B can be efficiently cooled.

The duct member 5 is disposed opposed to the crossing end surface 322, and the fins 3125 of the respective heat sinks 3123 extend in the direction crossing the crossing end surface 322. The heat sinks 3123 are cooled by air supplied from the G side outlet port 111, the first outlet sections 121 and 131, and the second outlet sections 122 and 132 provided at the other ends 113, 12B, and 13B of the duct member 5. According to this arrangement, the duct member 5 is disposed in the area inside the projector 1 as an area which often becomes a dead space. Also, air can reach the respective heat sinks 3123 without detour.

Accordingly, size reduction of the projector 1, and efficient cooling for the respective reflection type light modulation devices 312 to which the heat sinks 3123 are attached can be both achieved.

(2) The second reflection type light modulation device 312G is disposed between the first optical path and the second optical path. The second optical path is located near the heat sink 3123 attached to the second reflection type light modulation device 312G. The duct member 5 has the first outlet sections 121 and 131 corresponding to the first reflection type light modulation device 312R and the third reflection type light modulation device 312B, but does not have the first outlet section corresponding to the second reflection type light modulation device 312G. In this case, the second optical path can be positioned close to the second reflection type light modulation device 312G. There are provided the relay lens 24B, the polarization plate 25B, the collimating lens 26B and others on the second optical path. Accordingly, the projector 1 can project high-quality images while achieving efficient cooling for the first and third reflection type light modulation devices 312R and 312B and size reduction of the optical unit 2.

(3) The first outlet sections 121 and 131 are disposed at longer distances from the cross dichroic prism 32 than the corresponding distances of the second outlet sections 122 and 132. In this arrangement, the components provided around the cross dichroic prism 32 such as the projection lens 28 and the members for holding the projection lens 28 can be disposed with high space efficiency. Accordingly, the projector 1 can be further made compact and project images having higher optical quality while achieving efficient cooling for the first and third reflection type light modulation devices 312R and 312B.

(4) The air introduced through the introduction duct portion 6 is separated into parts flowing through the first through third channels R1 through R3 by the first through third air supply ducts 11 through 13 of the duct main body 7, and supplied to the respective heat sinks 3123. In this case, the plural heat sinks 3123, and thus the plural reflection type light modulation devices 312 to which the heat sinks 3123 are attached can be cooled by the simple structure and the decreased number of the parts. Thus, the projector 1 can be made compact and manufactured at low cost while achieving efficient cooling for the plural reflection type light modulation devices 312.

(5) The air introduced through the introduction duct portion 6 into the duct main body 7 is dispersed in directions along the crossing end surface 322 after collision with the inner surface of the duct main body 7, and is supplied to the first through third air supply ducts 11 through 13 with a good balance. Accordingly, the plural heat sinks 3123, and thus the three reflection type light modulation devices 312 can be cooled with a good balance.

Since air is supplied to the first through third air supply ducts 11 through 13 with a preferable balance in this structure, the necessity of providing complicated ribs or the like inside the duct main body 7 is eliminated. Thus, the structure of the duct main body 7 becomes simple. Moreover, the elimination of the complicated ribs or the like prevents stay of a part of the introduced air within the duct main body 7, allowing the introduced air to be effectively used for cooling of the reflection type light modulation devices 312.

(6) The second air supply duct 12 and the third air supply duct 13 communicate with the first channel R1 at the position almost coinciding with the introduction position P and at the same position in the flow direction of the first channel R1.

According to this arrangement, the air flowing inside the duct main body 7 collides with the inner surface of the duct main body 7 and disperses along the crossing end surface 322. Then, the dispersed air is supplied to the first through third air supply ducts 11 through 13 without supply of an excessively large amount of the air to any particular duct of the air supply ducts 11 through 13. Accordingly, the three heat sinks 3123, and thus the three reflection type light modulation devices 312 can be cooled with a further preferable balance.

Second Embodiment

A projector according to a second embodiment is hereinafter described with reference to the drawings.

The structures and parts of the projector in the second embodiment which correspond to similar structures and parts of the projector 1 in the first embodiment have been given similar reference numbers, and the detailed explanation of those is simplified or not repeated.

The projector in this embodiment includes the duct member 5 having a configuration different from that of the duct member 5 in the first embodiment.

FIGS. 9 through 12 illustrate the structure of the duct member 5 according to the second embodiment. More specifically, FIGS. 9 through 12 are perspective views of the duct member 5 in the second embodiment as viewed in the same directions as those of FIGS. 4 through 7.

The duct member 5 in this embodiment is different from the duct member 5 in the first embodiment in that the second air supply duct 12 and the third air supply duct 13 communicate with the first channel R1 at positions different from the corresponding positions in the first embodiment.

Figure 11:
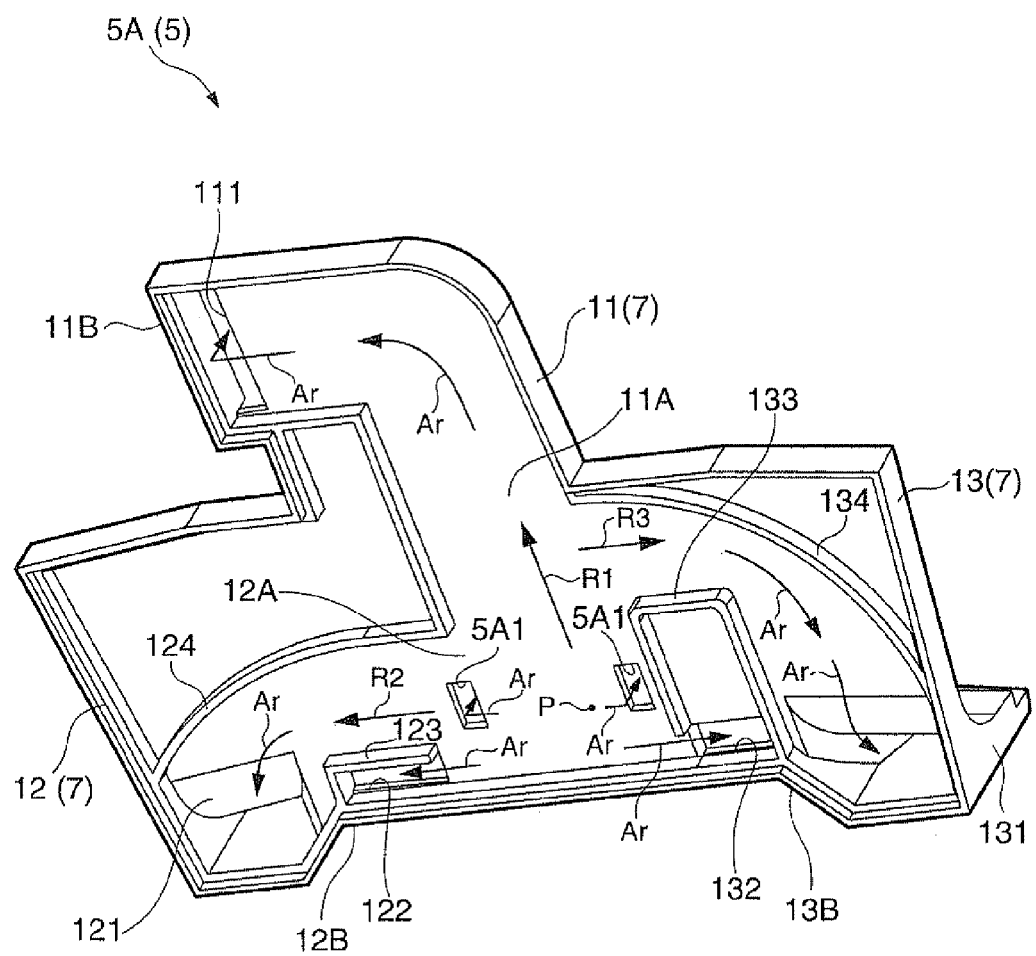
FIG. 11 illustrates the structure of the duct member according to the second embodiment.
Figure 12:
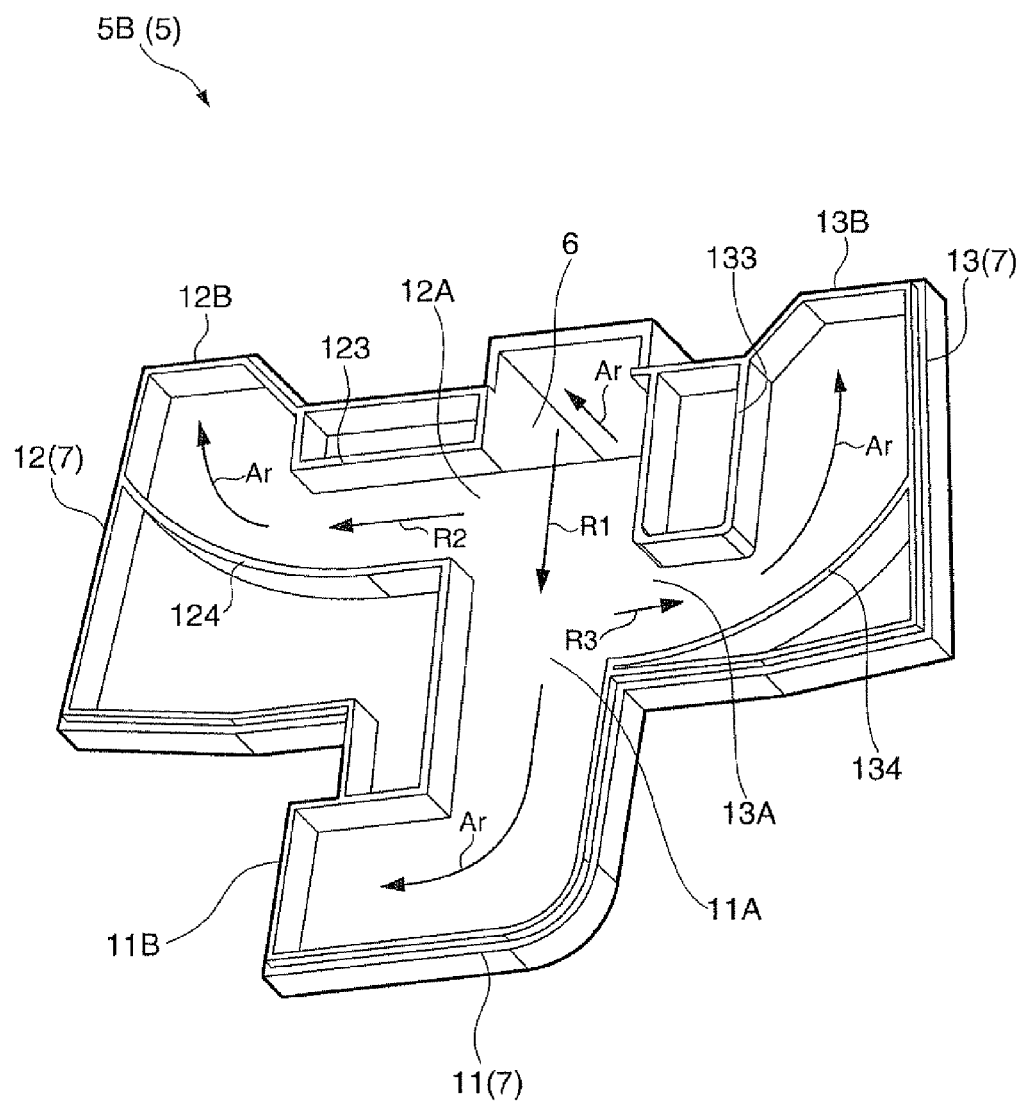
FIG. 12 illustrates the structure of the duct member according to the second embodiment.

More specifically, as illustrated in FIGS. 11 and 12, the shapes of the components such as the rectifying ribs 124 and 134 for rectifying the direction of the air Ar toward the first outlet sections 121 and 131 and a guiding rib 133 for guiding the air Ar toward the second outlet section 132 included in the duct member 5 in this embodiment are different from the corresponding shapes of the duct member 5 in the first embodiment. Thus, the second air supply duct 12 (channel toward the first outlet section 121) and the third air supply duct 13 (channel toward the first outlet section 131) communicate with the first channel R1 at different positions in the flow direction of the first channel R1 in accordance with the change of the respective shapes of the ribs 124, 133, 134 and the like.

The flow of air toward the respective reflection type light modulation devices 312 via the duct member 5 is substantially similar to the corresponding flow in the first embodiment as can be seen from FIGS. 9 through 12. Thus, the same explanation is not repeated.

According to this embodiment, therefore, the following advantages can be offered as well as the advantages (1) through (5) provided in the first embodiment.

According to the second embodiment, the second air supply duct 12 and the third air supply duct 13 communicate with the first channel R1 at different positions in the flow direction of the first channel R1.

In this arrangement, the air introduced through the introduction duct portion 6 into the duct main body 7 and flowing along the first channel R1 can be sequentially supplied to the first through third air supply ducts 11 through 13 with a good balance without supply of the most part of the air toward the second air supply duct 12 or the third air supply duct 13. Thus, the three reflection type light modulation devices 312 can be cooled with a good balance.

Modified Examples

The embodiments described herein may be modified in the following manners.

According to the embodiments, the first through third reflection type light modulation devices 312R, 312G, and 312B are provided to process the R light, G light, and B light, respectively. However, the color lights to be processed by the reflection type light modulation devices may be switched between each other.

According to the embodiments, the first outlet sections 121 and 131 and the second outlet sections 122 and 132 are provided on the second air supply duct 12 and the third air supply duct 13. However, the first outlet section and the second outlet section may be formed on only one of the first through third air supply ducts 11 through 13, or may be formed on all of the first through third air supply ducts 11 through 13.

According to the embodiments, the introduction duct portion 6 introduces air in the direction substantially perpendicular to the crossing end surface 322. However, air may be introduced in other directions.

According to the embodiments, the wire grid type reflection type polarization plates 311 are used. However, polarization plates having other structures may be employed as long as they are reflection type polarization plates. For example, each of the reflection type polarization plates may be a polarization separation element including dielectric multilayer film, a layered polymer polarization plate on which layers of organic material having refractive index anisotropy (double refraction) such as liquid crystal are laminated, an optical element as a combination of a ¼ wavelength plate and a circular polarization reflection plate which separates light having no polarization into circularly polarized light in the clockwise direction and circularly polarized light in the anti-clockwise direction, an optical element which separates polarized light for reflection from polarized light for transmission based on Brewster's angle, or a hologram optical element using hologram.

The light source 211 is not limited to the discharge type lamp but may be a lamp of other types or a solid light source such as a light emitting diode.

The present application claim priority from Japanese Patent Application No. 2010-141458 filed on Jun. 22, 2010, and No. 2010-266226 filed on Nov. 30, 2010, which is hereby incorporated by reference in its entirety.

What is claimed is:
1. A projector comprising:
   a plurality of reflection type light modulation devices which modulates a corresponding color light of plural color lights;

a color synthesizing optical device which has a plurality of light entrance side end surfaces receiving the corresponding color lights modulated by the plural reflection type light modulation devices and a crossing end surface crossing the light entrance side end surfaces to combine the received color lights;

a heat sink which has a base attached to the corresponding reflection type light modulation device, and a fin protrusion from the base and extending in a direction crossing the crossing end surface; and a duct member disposed at a position opposed to the crossing end surface to supply introduced air toward the heat sink, wherein the duct member includes
- a first outlet section disposed opposed to the fin such that the introduced air can be supplied toward the base through the first outlet section, and
- a second outlet section through which the introduced air is supplied in the extending direction of the fin.

2. The projector according to claim 1, wherein
the plural reflection type light modulation devices include first, second, and third reflection type light modulation devices each of which modulates a corresponding color light of three color lights;
the second reflection type light modulation device is disposed between the optical path of light entering the first reflection type light modulation device and the optical path of light entering the third reflection type light modulation device; and
the duct member has the first outlet section corresponding to the heat sinks attached to the first and third reflection type light modulation devices but does not have the first outlet section corresponding to the heat sink attached to the second reflection type light modulation device.

3. The projector according to claim 2, wherein the first outlet section is disposed at a longer distance from the color synthesize optical device than the distance of the second outlet section from the color synthesize optical device.

4. The projector according to claim 1, wherein
the duct member has an introduction duct portion through which air is introduced into the projector, and a duct main body which disperses the air introduced through the introduction duct portion into a plurality of channels;
the duct main body has a plurality of air supply ducts forming the plural channels through which air is supplied to the heat sinks; and
at least one of the plural air supply ducts communicates with the first outlet section and the second outlet section.

5. The projector according to claim 2, wherein
the duct member has an introduction duct portion through which air is introduced into the projector, and a duct main body which disperses the air introduced through the introduction duct portion into a plurality of channels;
the duct main body has a plurality of air supply ducts forming the plural channels through which air is supplied to the heat sinks; and
at least one of the plural air supply ducts communicates with the first outlet section and the second outlet section.

6. The projector according to claim 4, wherein
the duct main body extends along the crossing end surface; and
the introduction duct portion introduces air in a direction crossing the crossing end surface toward the duct main body.

7. The projector according to claim 5, wherein
the duct main body extends along the crossing end surface; and
the introduction duct portion introduces air in a direction crossing the crossing end surface toward the duct main body.

8. The projector according to claim 4, wherein
the three air supply ducts are provided;
the duct main body has a first channel linearly extending from an air introduction position toward one of the three air supply ducts;
the two air supply ducts other than the one air supply duct toward which the first channel extends communicate with the first channel at the same position in the flow direction of the first channel; and
the air introduction position of the introduction duct portion almost coincide with the communication position between the first channel and the other two air supply ducts.

9. The projector according to claim 6, wherein
the three air supply ducts are provided;
the duct main body has a first channel linearly extending from an air introduction position toward one of the three air supply ducts;
the two air supply ducts other than the one air supply duct toward which the first channel extends communicate with the first channel at the same position in the flow direction of the first channel; and
the air introduction position of the introduction duct portion almost coincide with the communication position between the first channel and the other two air supply ducts.

10. The projector according to claim 4, wherein
the three air supply ducts are provided;
the duct main body has a first channel linearly extending from an air introduction position toward one of the three air supply ducts;
the two air supply ducts other than the one air supply duct toward which the first channel extends communicate with the first channel at different positions in the flow direction of the first channel.

11. The projector according to claim 6, wherein
the three air supply ducts are provided;
the duct main body has a first channel linearly extending from an air introduction position toward one of the three air supply ducts;
the two air supply ducts other than the one air supply duct toward which the first channel extends communicate with the first channel at different positions in the flow direction of the first channel.

* * * * *